United States Patent Office 2,980,545
Patented Apr. 18, 1961

2,980,545

WATER BASE STENCIL DUPLICATING INK

Clarence J. Shoemaker, Elmhurst, Ill., assignor to A. B. Dick Company, Niles, Ill., a corporation of Illinois No Drawing. Filed Oct. 29, 1957, Ser. No. 693,009

5 Claims. (Cl. 106—22)

This invention relates to stencil duplicating inks and to the formulation thereof.

To the present, stencil duplicating inks have been formulated with an oil base in which a tinctorial agent has either been dispersed or dissolved. Such oil base inks have been found to be objectionable from the standpoint of show-through and set-off as a result of the non-drying character of the ink or the large amount of non-drying oil that is present. In addition, the oily component of the ink tends to spread by capillary action into adjacent portions of the copy sheet to provide a halo which is also objectionable from the standpoint of the appearance of the copy and from the standpoint of copy quality.

Many of these objectionable characteristics of oil base inks have been overcome by water base inks of the type described by Chambers et al. in Patents Nos. 2,479,037 and No. 2,556,902. The water base ink compositions eliminate the oil component by the use of a water soluble, water stable resinous material or cellulose derivative to impart the desired body and flow characteristics to the aqueous system in which a desired amount of tinctorial agent has been introduced to produce copy of good readable quality. The water base inks have been proven highly successful as an improvement over the oil base inks which have previously been employed. It has been found, however, that in use with various paper stocks, the water base ink compositions tend to cause sticking or lamination of the paper upon which copy has been produced. It is believed that this lamination characteristic or sticking has some relationship with the resinous component or bodying agent that is employed in the ink composition.

Thus, it is an object of this invention to produce and to provide a method for producing a new and improved stencil duplicating ink which contains a minimum amount of oil; which contains water as a base or principal diluent; which is stable in handling; which is rapid in drying; which has minimum set-off in use; which is free of resinous materials or binders which can cause sticking or lamination; and which can be formulated of low cost and readily available materials.

These and other objects and advantages of this invention will hereinafter appear and for purposes of illustration, but not of limitation, a representative formulation of an ink composition embodying the features of this invention will hereinafter be given.

*Example 1*

20 percent by weight petroleum sulfonate
17 percent by weight mineral oil
8 percent by weight sorbitol mono-oleate (non-ionic emulsifying agent)
3 percent by weight triethylene glycol
5 percent by weight Nigrosine WSJ (oil soluble dye)
47 percent by weight water All of the ingredients with the exception of the water are mixed together and then the water is slowly added with stirring. A clear system forms which is indicative of the presence of an extremely stable system having the appearance of a solution but which apparently is in the form of a sol since it is made up of incompatible materials such as oil and water which apparently are held together by means of a coupling agent, as represented by the glycol component, as will hereinafter appear.

As used herein, the term "petroleum sulfonate" is intended to refer to an alkali metal or alkaline earth metal petroleum sulfonate, such as sodium, calcium, or potassium petroleum sulfonate. In practice, use can be made of the alkali metal or alkaline earth metal petroleum sulfonate alone or in admixture with mineral oil, such as the compound marketed under the trade name "Petronate L," which contains about 62 percent by weight of sodium petroleum sulfonate, 33 percent by weight of mineral oil, and 5 percent by weight water. The amount of petroleum sulfonate capable of being employed in the ink composition depends greatly upon the viscosity of the sulfonate. For use in the practice of this invention, it is preferred to make use of a petroleum sulfonate having a molecular weight average within the range of 375–475 wherein the amount can vary from a minimum of 15 percent by weight to a maximum of 40 percent by weight in the ink composition. As previously pointed out, the maximum will depend upon the viscosity of the sulfonate. Thus, when a sulfonate of lower viscosity or molecular weight is employed, the amount of sulfonate in the ink composition can be increased but the amount should not exceed 50 percent by weight.

The mineral oil component is preferably selected of an oil having a paraffinic base. When defined in the conventional manner by API number, the mineral oil employed in the practice of this invention should have an API number of between 32 and 36. When mineral oil having an API number less than 30 is employed, indicating the presence of a lesser amount of paraffinic groups and greater amounts of naphthenic groups, an unstable ink composition will be secured by comparison with an ink employing the same ingredients but formulated with a mineral oil having an API number within the range of 32–36. The amount of mineral oil can range between 10–50 percent by weight of the ink composition but it is preferred to make use of a mineral oil component within the range of 15–35 percent by weight.

The sorbitol mono-oleate comprises a non-ionic agent which embodies a proper balance between hydrophilic groups for compatibility with the aqueous component of the system and hydrophobic or oleophilic groups which embody proper balance with the mineral oil component of the composition to tie in both the water and the oil component of the ink composition. Thus the sorbitol mono-oleate functions to bring the water and oil in harmonious relationship one with the other to foster the clear and stable system. Instead of the sorbitol mono-oleate, use can be made of other polyhydric alcohol esters of high molecular weight organic acids or fatty acids, as represented by sorbitan sesquioleate, sorbitan mono-stearate, sorbitan trioleate, sorbitan mono-laurate polyoxyethylene derivatives, sorbitan mono-palmitate polyoxyethylene derivatives, sorbitan mono-stearate polyoxyethylene derivatives, and the like. The described non-ionic component can be employed in an amount ranging from 2.5–20 percent by weight of the ink composition.

The triethylene glycol functions as a coupling agent which ties in the phases substantially completely one with the other in the ink composition. In practice, it is unnecessary to make use of both the sorbitan mono-oleate component and the triethylene glycol component together in the ink composition but it is desirable to make use of one or the other and preferably both in the ink composition. Instead of the triethylene glycol component, use can be made of other water miscible polyols or polyglycols such as glycerol, diethylene glycol, ethylene glycol, butyl carbitol or the like, or an aerosol compound such as "Aerosol 22." The amount of triethylene glycol or the like polyol may range from 1–6 percent by weight of the ink composition and preferably within the range of 3–5 percent. When lesser amounts are employed, noticeable instability will become evident in the ink composition.

The tinctorial agent may be selected of the various dyes and pigments ordinarily employed in stencil duplicating inks, as defined in the aforementioned issued patent of Chambers et al. It is desirable to make use of an amount of tinctorial agent capable of giving copy of good color intensity and readability. When a dye component is employed the amount required will be less than that demanded of a pigment, such as carbon black or the like. By way of example, a dye component may be employed in an amount ranging from 3–7 percent by weight of the ink composition while a pigment or carbon black dispersion may be employed in an amount ranging from 3–15 percent by weight of the ink composition.

The remainder of the ink composition comprises water. It is desirable to make use of a minimum amount of water for the purpose of achieving more rapid drying. Yet, use should be made of an amount of water which will produce the desired sol. In general, the amount of water will range from 20–65 percent by weight and more often in an amount within the range of 35–60 percent by weight of the final ink composition.

Having described the various components and their functions and concentrations in the ink composition, the following examples will be given by way of further illustration of the practice of this invention:

*Example 2*

25 percent by weight sodium petroleum sulfonate (molecular weight average 375)
20 percent by weight mineral oil (API 36)
4 percent by weight sorbitol mono-laurate
15 percent by weight Aqua black (40% aqueous dispersion)
36 percent by weight water

*Example 3*

20 percent by weight petroleum sulfonate (62 parts sodium petroleum sulfonate-molecular weight average 425, 33 parts mineral oil, 5 parts water)
10 percent by weight mineral oil (API 32)
5 percent by weight glycerol
15 percent by weight Aqua black (40% aqueous dispersion)
50 percent by weight water

*Example 4*

15–40 percent by weight petroleum sulfonate
10–50 percent by weight mineral oil (API 32–36)
2.5–20 percent by weight non-ionic polyhydric alcohol ester of high molecular weight organic acids
3–15 percent by weight tinctorial agent
20–65 percent by weight water It will be apparent from the foregoing that I have provided a stable aqueous system capable of use as a stencil duplicating ink and in which adhesive components are absent which otherwise would cause sticking and lamination between the copy sheets. An ink composition of the type produced in accordance with the practice of this invention can be manufactured at low cost of readily available materials to produce a stencil duplicating ink which may be employed on conventional high speed stencil duplicating machines to produce copy of good quality.

It will be understood that changes may be made in the details of formulation without departing from the spirit of the invention, especially as defined in the following claims.

I claim:

1. A stable, aqueous stencil duplicating ink composition consisting essentially of:

15–40 percent by weight petroleum sulfonate having a molecular weight average of 375–475
10–50 percent by weight of a mineral oil having an API number within the range of 32–36
2.5–20 percent by weight of a non-ionic polyhydric alcohol ester of a high molecular weight organic fatty acid
1–5 percent by weight of a water miscible polyol
3–15 percent by weight of a tinctorial agent
20–65 percent by weight of water 2. A stable, aqueous stencil duplicating ink composition consisting essentially of:

15–40 percent by weight petroleum sulfonate
10–50 percent by weight of a mineral oil having an API number within the range of 32–36
2.5–20 percent by weight of a non-ionic polyhydric alcohol ester of a high molecular weight organic fatty acid
1–5 percent by weight of a water miscible polyol
3–15 percent by weight of a tinctorial agent
20–65 percent by weight of water.

3. A stable, aqueous stencil duplicating ink composition consisting essentially of:

15–40 percent by weight petroleum sulfonate
15–35 percent by weight of a mineral oil having an API number within the range of 32–36
2.5–20 percent by weight of a non-ionic polyhydric alcohol ester of a high molecular weight organic fatty acid
1–5 percent by weight of a water miscible polyol
3–15 percent by weight of a tinctorial agent
20–65 percent by weight of water.

4. A stable, aqueous stencil duplicating ink composition consisting essentially of:

15–40 percent by weight petroleum sulfonate
10–50 percent by weight of a mineral oil having an API number within the range of 32–36
2.5–20 percent by weight of sorbitol mono-oleate
1–5 percent by weight of a water miscible polyol
3–15 percent by weight of a tinctorial agent
20–65 percent by weight of water.

5. A stable, aqueous stencil duplicating ink composition consisting essentially of:

15–40 percent by weight petroleum sulfonate
10–50 percent by weight of a mineral oil having an API number within the range of 32–36
2.5–20 percent by weight of a non-ionic polyhydric alcohol ester of a high molecular weight organic fatty acid
1–5 percent by weight of triethylene glycol
3–15 percent by weight of a tinctorial agent
20–65 percent by weight of water.

References Cited in the file of this patent

UNITED STATES PATENTS

| | | |
|---|---|---|
| 2,479,037 | Chambers et al. | Aug. 16, 1949 |
| 2,629,697 | Langdon et al. | Feb. 24, 1953 |
| 2,754,218 | Magie | July 10, 1956 |